United States Patent [19]
Schremmer

[11] Patent Number: 6,109,075
[45] Date of Patent: Aug. 29, 2000

[54] SECURING ARRANGEMENT FOR A STEERING WHEEL LOCK

[75] Inventor: Gottfried Schremmer, Tamm, Germany

[73] Assignee: DaimlerChrysler AG, Stuttgart, Germany

[21] Appl. No.: 09/286,302

[22] Filed: Apr. 6, 1999

[30] Foreign Application Priority Data

Apr. 6, 1998 [DE] Germany ............................ 198 15 311

[51] Int. Cl.[7] ................................................. B60R 25/02
[52] U.S. Cl. .......................... 70/186; 70/252; 70/DIG. 57
[58] Field of Search ............................. 70/182–187, 252, 70/DIG. 57, 229–232, 451

[56] References Cited

U.S. PATENT DOCUMENTS

| | | | |
|---|---|---|---|
| 1,268,137 | 6/1918 | Mailloux | 70/DIG. 57 X |
| 1,288,606 | 12/1918 | Jensen | 70/DIG. 57 X |
| 1,414,991 | 5/1922 | McKeage | 70/DIG. 57 X |
| 1,744,167 | 1/1930 | Keil | 70/DIG. 57 X |
| 2,171,664 | 9/1939 | McFarland | 70/DIG. 57 X |
| 3,250,101 | 5/1966 | Jeavons et al. | 70/186 X |
| 3,919,867 | 11/1975 | Lipschutz et al. | 70/186 |
| 4,051,790 | 10/1977 | Meditz et al. | 70/DIG. 57 X |
| 4,062,208 | 12/1977 | Nielsen, Jr. | 70/186 X |
| 4,771,619 | 9/1988 | Shiramizu et al. | 70/186 |
| 4,798,067 | 1/1989 | Peitsmeier et al. | 70/186 X |
| 4,854,142 | 8/1989 | Peitsmeier et al. | 70/186 |
| 5,079,935 | 1/1992 | Zaucha | 70/DIG. 57 X |
| 5,211,042 | 5/1993 | Watanuki | 70/252 |
| 5,363,677 | 11/1994 | Cox | 70/DIG. 57 X |
| 5,454,238 | 10/1995 | Ross et al. | 70/186 |
| 5,709,367 | 1/1998 | Heintz et al. | 70/DIG. 57 X |
| 5,730,010 | 3/1998 | Norimatsu et al. | 70/186 |
| 5,730,011 | 3/1998 | Terai | 70/186 |
| 5,794,469 | 8/1998 | Suzuki | 70/186 X |

FOREIGN PATENT DOCUMENTS

| | | | |
|---|---|---|---|
| 0 094 568 A2 | 11/1983 | European Pat. Off. . | |
| 1423013 | 11/1965 | France | 70/186 |
| 23 66 072 | 9/1977 | Germany . | |
| 36 26 014 C2 | 2/1988 | Germany . | |
| 607450 | 8/1960 | Italy | 70/186 |

*Primary Examiner*—Suzanne Dino Barrett
*Attorney, Agent, or Firm*—Evenson, McKeown, Edwards & Lenahan, P.L.L.C.

[57] ABSTRACT

A securing arrangement for a steering wheel lock fastened on a steering column tube of a steering system of a motor vehicle is disclosed. The securing arrangement has a steering-column-fixed receiving device on which a lock housing is fastened, the receiving device and the lock housing having aligned bores which are penetrated by a securing bolt. The securing bolt is at least almost completely surrounded by the receiving device and/or the lock housing.

12 Claims, 3 Drawing Sheets

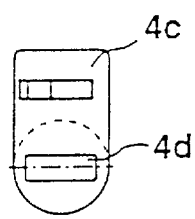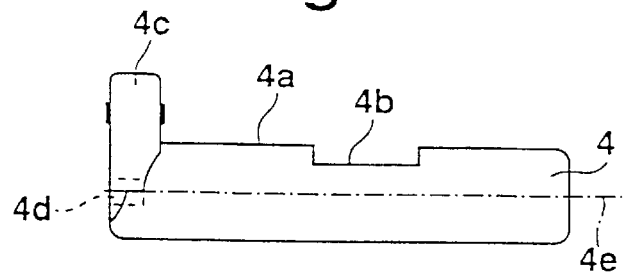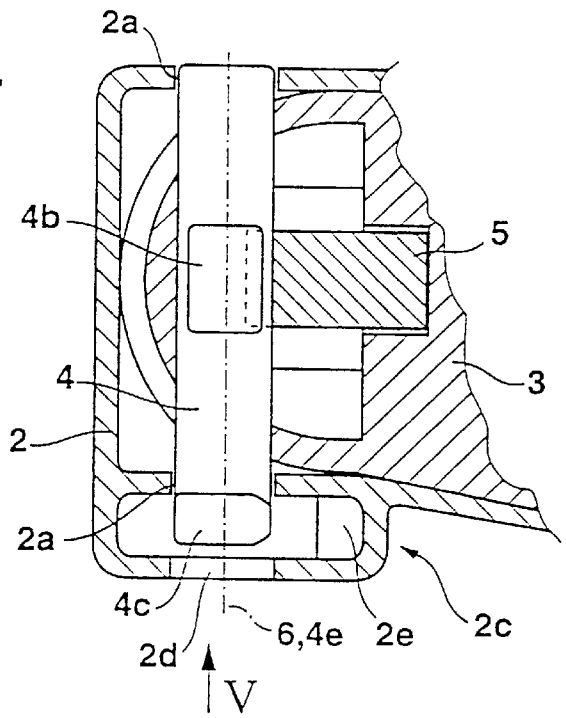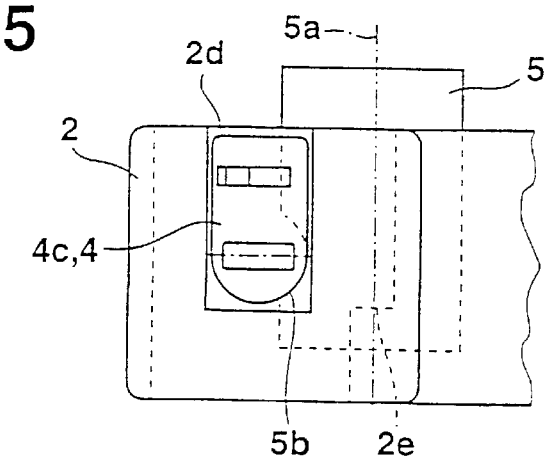

SECURING ARRANGEMENT FOR A STEERING WHEEL LOCK

BACKGROUND AND SUMMARY OF THE INVENTION

This application claims the priority of German Patent Application No. 198 15 311.2, filed Apr. 6, 1998, the disclosure of which is expressly incorporated by reference herein.

The invention relates to a securing arrangement for a steering wheel lock which is fastened to a steering column tube of a steering system of a motor vehicle and has a steering-column-tube-side receiving device on which a lock housing is fastened, the receiving device and the lock housing having aligned bores which are penetrated by a securing bolt, the securing bolt being at least almost completely surrounded by the receiving device, the lock housing, or both.

A securing arrangement of this type is disclosed by German Patent Document DE 23 66 072 B2. The steering wheel lock has a lock housing which is fastened by means of a securing bolt on a receiving device of the steering column tube. The securing bolt has a slidable design and is loaded by a coil spring in its release direction and by an elastic disk in its locking direction, which elastic disk can be operated from the outside by means of a tool. The elastic disk can exercise higher forces on the securing bolt than the coil spring in order to be able to hold the securing bolt in its locking position.

European Patent Document EP 0 094 568 A2 discloses another securing device for a steering wheel lock in which lock housing can be fastened by a locking pin in a steering-column-tube-fixed receiving device.

German Patent Document DE 36 26 014 C2, corresponding to U.S. Pat. No. 4,854, 142, discloses a securing arrangement which has a first housing part fixedly connected with the steering column tube of a motor vehicle steering shaft, and onto which a second housing part is fitted. A control rod for a lock bolt is guided in the two housing parts, which lock bolt engages in a locking position in a steering shaft detent ring fixed to the steering shaft and blocks a rotation of the steering shaft in this manner. The housing parts have mutually overlapping sections through which aligned bores extend in which a securing bolt is guided. In a center area, the securing bolt has a recess in which the lock bolt engages particularly when it is in its locking position blocking the steering shaft. In this position of the above-mentioned securing arrangement, the securing bolt is form-lockingly secured with respect to an axial displacement so that it cannot be removed. On one side, the securing bolt has a screw thread which protrudes out of the housing parts and onto which a nut is screwed for securing purposes.

It is an object of the invention to provide a securing arrangement of the initially mentioned type which ensures a reliable authorized removal possibility, on the one hand, and a secure disassembly protection against a violent intervention, on the other hand.

This object is achieved in that the securing bolt has a first non-circular section to which a lock bolt, which can be moved between a locking position and a release position, is applied in a form-locking manner outside its release position and blocks the securing bolt, the securing bolt being arranged to be rotatable between a displacement position, in which it can be removed from the lock housing, and a detent position, in which it is blocked on a housing-fixed stop. In this case, the application surfaces, which the securing bolt exhibits to the outside, are reduced to a minimum, the faces being lowered into the housing so that, in particular, a violent driving-through of the securing bolt in its axial direction is largely prevented by the housing. In addition, a reaching around the securing bolt is excluded. An unauthorized removal of the steering wheel lock is therefore prevented. The securing bolt has a basic shape that is essentially cylindrical. The non-circular section deviates from this shape and preferably has one or several plane application surfaces. The lock bolt can form-lockingly be applied to such a section and can prevent a rotation and/or an axial displacement of the securing bolt. As result, a double fixing for the securing bolt in the detent position of the securing bolt can be achieved on the one hand because the lock bolt as well as the housing-fixed stop can prevent an axial displacement of the securing bolt. On the other hand, the securing bolt can be removed from the locking housing only in its displacement position which it reaches by a rotation starting from the detent position which cannot be managed by violent means or is very difficult to manage because of the form-locking application of the lock bolt on the non-circular section of the securing bolt.

As a further development of the invention, the securing bolt has as a first non-circular section a recess into which the lock bolt engages outside its release position, the lock bolt also having a recess into which the securing bolt engages outside its detent position, whereby the lock bolt is blocked in the release position. As a result, no engagement occurs between the lock bolt and the securing bolt precisely when the lock bolt is in its release position and the securing bolt is in its detent position. Optionally one of the two blocking elements can be moved out of this so-called "neutral position", whereby the other element is blocked.

In a further development of the invention, the securing bolt has a second non-circular section with a projection which projects eccentrically to an axis of rotation and to which a housing-fixed stop is assigned. The projection protrudes over the cylindrical surface of the securing bolt so that the projection of the securing bolt can strike against the stop in the circumferential direction and/or in the axial direction of the securing bolt. As the result of a slide-in opening in the housing, the stop may be constructed with a cross-section corresponding to the second non-circular section of the securing bolt, so that an axial stop is obtained which acts outside the displacement position of the securing bolt.

In a further development of the invention, the radially projecting protrusion is constructed as a bolt head on a face of the securing bolt which is arranged in a receiving pocket. The receiving pocket has two mutually opposite walls between which the bolt head can be inserted in a precisely fitting manner. As a result, an axial stop can be obtained which acts on two sides for the complete fastening of the securing bolt.

In a further development of the invention, tool application surfaces are provided on a face of the securing bolt which are dimensioned such that forces which can be generated by an applied tool are lower than the counterforces defined by the form closure of the securing bolt and/or of the lock bolt. The tool application surfaces preferably represent the only possibility for operating the securing bolt and simultaneously form a desired breaking point or a force limiting arrangement. In the event of a violent intervention, the tool application surfaces are destroyed but not the important parts of the securing arrangement arranged in the housing. Furthermore, the tool application surfaces in conjunction with the enclosed accommodation of the securing bolt in the lock housing, by limiting the size of the applied tool, can also be used for limiting the forces which can be maximally introduced.

In a further development of the invention, the tool application surfaces are arranged within a recess in the face of the securing bolt. As a result, the securing bolt can be rotated only by means of those tools which can be fitted into the recess. The torque which can be maximally introduced can therefore be estimated by means of the provided tool cross-section and the securing bolt can be dimensioned correspondingly.

Other objects, advantages and novel features of the present invention will become apparent from the following detailed description of the invention when considered in conjunction with the accompanying drawings.

BRIEF DESCRIPTION OF THE DRAWINGS

FIGS. 3a and 3b are two views of a securing bolt of the securing arrangement according to the invention;

FIG. 4 is a sectional view along Line IV—IV of the securing arrangement of the invention according to FIG. 2, showing an engaging arrangement between the lock bolt and the securing bolt inserted in the lock housing;

FIG. 5 is a view of the securing arrangement according to FIG. 4 in the direction of the arrow V;

DETAILED DESCRIPTION OF THE DRAWINGS

Figure 6:
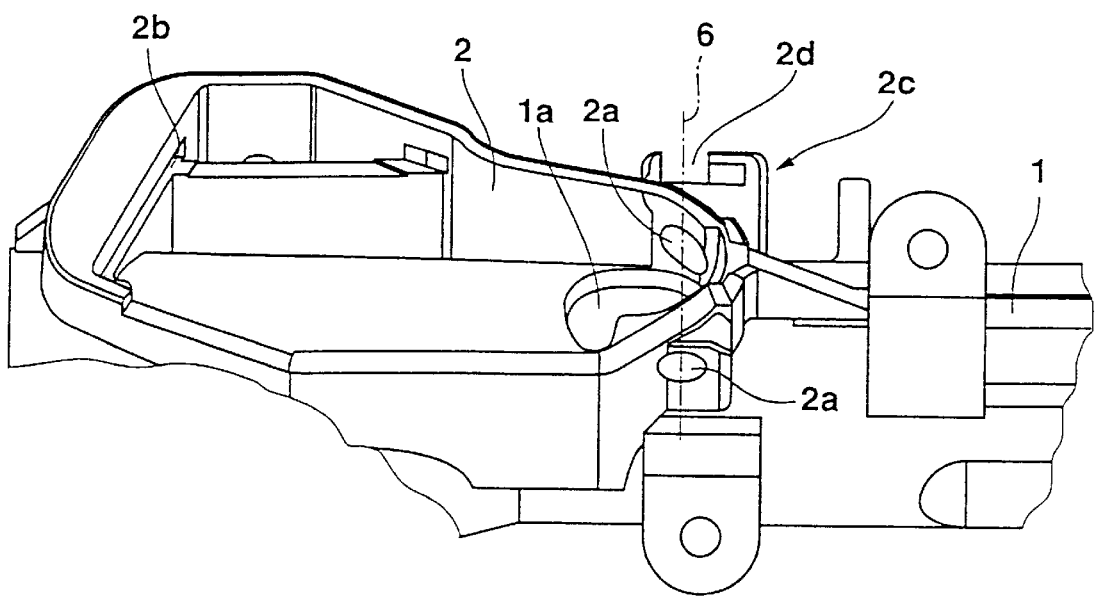
FIG. 6 is a perspective view of a section of a steering column tube of a motor vehicle steering shaft including the receiving device of the securing arrangement according to the invention.

As illustrated particularly in FIG. 6, a steering shaft of a motor vehicle (not shown) is surrounded by a steering column tube 1 which has a recess 1a assigned to a steering shaft detent ring (not shown). A receiving device for a lock housing in the form of a receiving console 2, which surrounds the recess 1a, is mounted on the steering column tube 1, which receiving console 2 is constructed to be connected either in one piece or non-detachably fixedly with the steering column tube 1. In the area of the recess 1a, the receiving console 2 has bores 2a which are aligned with one another in the transverse direction of the steering column tube 1, while an indentation 2b is provided on the side of the receiving console 2 situated opposite the bores 2a in the axial direction of the steering column tube.

Figure 1:
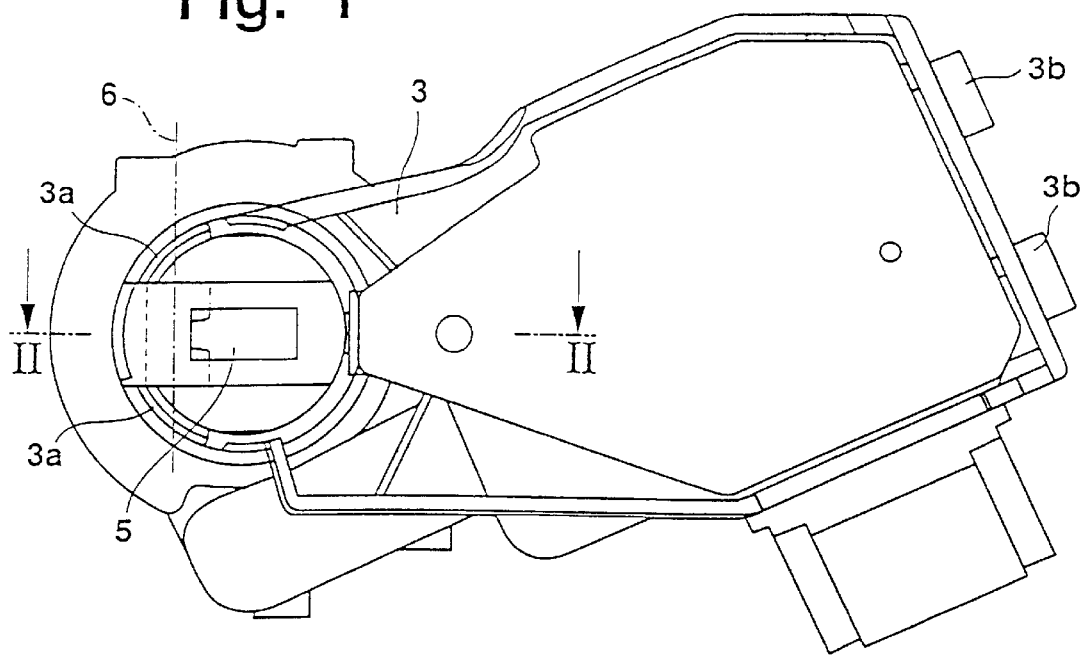
FIG. 1 is an exterior view from below of a lock housing of a securing arrangement for a motor vehicle steering wheel lock.

A lock housing 3 illustrated in FIG. 1 can be inserted in the receiving console 2 such that two detent noses 3b on the side of the lock housing 3 engage in the indentation 2b of the receiving console and two bores 3a in an exterior wall of the lock housing 3 can be situated to be aligned with the bores 2a in the receiving console. Through the aligned bores 2a and 3a, a securing bolt 4 with an essentially cylindrical basic shape, which is illustrated in FIGS. 3a to 5 can be inserted along a guiding and rotating axis 6 into the receiving console and the lock housing, whereby the lock housing is fastened in the receiving console. The lock housing 3 contains, among other things, a locking system, of which only a motor-driven lock bolt 5 is illustrated in the drawings.

Figure 2:
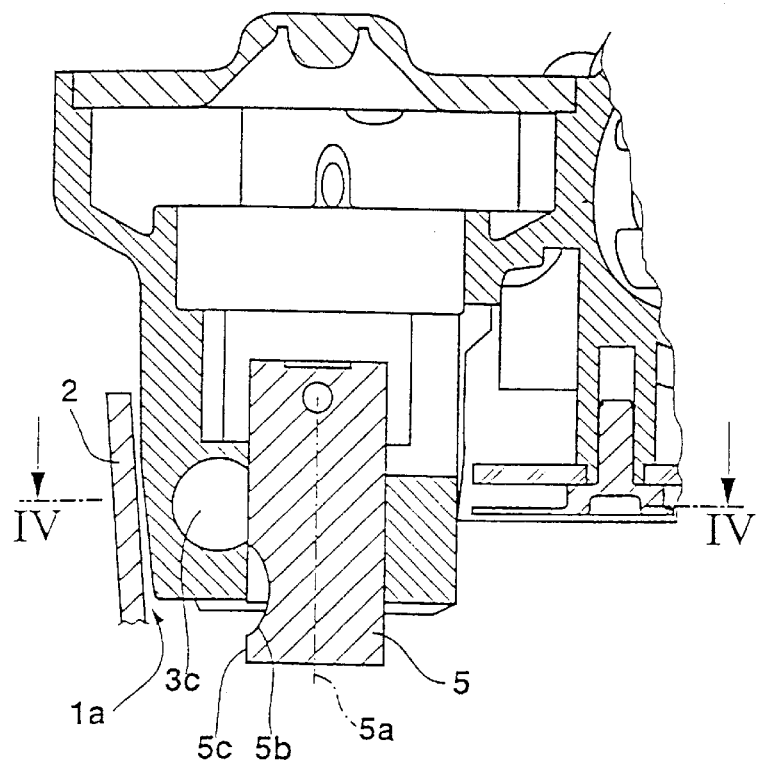
FIG. 2 is a sectional view along Line II—II of the lock housing according to FIG. 1 inserted into a receiving device, a lock bolt being illustrated in its blocking position.

The lock bolt 5 has an essentially continuous rectangular cross-section and is arranged to be slidable along its main axis 5a extending transversely to the steering shaft between a blocking position and a release position. In its blocking position illustrated in FIG. 2, the lock bolt 5 projects through the recess 1a in the steering column tube 1 and engages in the steering shaft detent ring, by means of which it non-rotatably locks the steering shaft. In its release position illustrated in FIG. 5, the lock bolt 5 is completely withdrawn into the lock housing 3 so that it no longer reaches through the recess 1a. When the lock bolt 5 is in its release position, a concave recess 5b on the side of the lock bolt 5 corresponds with an essentially cylindrical guide 3c for the securing bolt 4 in the lock housing 3. In this position of the lock bolt, the recess 5b supplements the guide 3c for forming a guide with a cylindrical cross-section which at this point completely surrounds the inserted securing bolt 4. As a result, in the release position of the lock bolt 5, the securing bolt 4 can be arbitrarily moved through the bores 2a, 3a and the guide 3c. In a position of the lock bolt 5 outside the release position, the flat forward lateral surface 5a of the lock bolt 5 engages at this point in the guide 3c.

As mentioned above, the securing bolt 4 has a body 4a of an essentially cylindrical shape which can be fitted with a slight play into the bores 2a, 3a as well as the corresponding guide 3c.

In the mounted condition, the cylinder axis 4e of the securing bolt 4 coincides with the guide axis 6. In its cylinder surface 4a, the securing bolt also has a recess 4b with a plane face whose longitudinal dimension corresponds to the width of the lock bolt 5 so that the lock bolt can engage such in the recess 4b that its forward lateral face 5c can come to rest against the recess surface 4b. Furthermore, the securing bolt 4 has a second non-circular section in the form of an eccentric head 4c on its face, which head 4c, as illustrated in FIGS. 3a and 3b, projects away from the cylinder surface 4a. In addition, a non-circular recess with tool application faces in the form of a slot 4d for introducing forces is provided on the face side.

According to the invention, the positioning of the securing bolt 4 takes place inside the receiving console 2, as illustrated in FIG. 4. In this case, the completely inserted securing bolt 4 is surrounded on all sides by the receiving console 2, in which case a double-walled section in the form of a receiving pocket 2c is provided on the receiving console, which receiving pocket 2c separately encloses the head of the securing bolt. In the completely inserted condition, the securing bolt 4 is accessible in the area of its forward face only through an opening 2d in the exterior wall which is just large enough for the head 4c of the securing bolt to fit through, the cross-section of the opening 2d preferably corresponding to the contour of the head. The space between the walls of the double-walled section 2c is also designed such that, starting from a displacement position illustrated in FIGS. 4 and 5, in which it can be taken out of the lock housing, the securing bolt is permitted a clockwise rotation of 90°. As a result of the rotation, it arrives in a detent position in which the faces of the head 4c are fitted largely without play between the walls of the receiving pocket 2c. In the receiving pocket 2c, a projection 2e is provided which is used as a stop for the head of the securing bolt and prevents a further rotation.

The operation of the securing arrangement according to the invention takes place as follows. When the ignition lock is open, the lock bolt 5 is in its release position according to FIG. 5. In this position of the lock bolt, the securing bolt 4 can be slid into or removed from the receiving console 2 as well as the locking housing 3 inserted in it. By way of the adapted bolt head 4c, the opening 2d in the exterior wall of the receiving console determines the position of the bolt 4, in which the bolt can be slide into the housing. In addition, the interior wall of the section 2c forms an axial stop for the securing bolt 4 so that, when inserted into the housing, it is blocked in the displacement position illustrated in FIG. 4. In this position, the securing bolt 4, in turn, blocks a movement of the lock bolt 5 in the direction of its main axis 5a because it form-lockingly engages in the recess 5b by means of its cylinder surface 4a.

Starting from its displacement position, the securing bolt 4 can be rotated by 90°, so that the recess 4b on the side of the securing bolt comes to be situated directly opposite the recess 5b of the lock bolt 5. From this configuration of the securing bolt and the lock bolt—a so-called neutral position—on the one hand, the lock bolt can be displaced into its blocking position according to FIG. 2 and, on the other hand, the securing bolt can be rotated into the displacement position according to FIG. 4 and 5.

While leaving the securing bolt in the detent position, the lock bolt can therefore moved into the blocking position and thereby lock the steering wheel lock. As soon as the lock bolt is situated outside the release position, the securing bolt 4 is immovably locked in place in the lock housing and in the receiving console, in which case a displacement of the securing bolt 4 in the direction of the guide axis 6 and a rotation of the securing bolt 4 about the guide axis 6 is prevented by the lock bolt 5 engaging in the recess 4b.

Breaking or disabling the securing arrangement or the lock by a violent hitting of the securing bolt 4 through the housing, for example, by means of a hammer, is prevented by: (i) the double form-locking axial fastening of the securing bolt 4 (by way of the head 4c on the receiving console 2 and, in addition, by way of the recess 4b, on the lock bolt 5) and (ii) the sunk arrangement of the securing bolt inside the receiving console 2. As the result, no sufficient application surface is offered to conventional tools so that the impact forces which can be introduced into the securing bolt 4 are limited.

A violent rotation of the securing bolt 4 inside its bearing is effectively prevented in that the bolt head 4c is inaccessibly housed in the receiving pocket 2c because larger tools no longer have application surfaces. The slot 4d therefore forms the only tool application surfaces and limits the torque which can be introduced because it limits the size of the applied tool. However, since the forces which can be applied by means of small tools are lower than the counterforces defined by the form closure of the securing bolt and the lock bolt, the securing bolt cannot be rotated.

In a modified embodiment of the securing arrangement according to the invention, the head 4c of the securing bolt with the slot 4d is designed such that, in the event of a moment introduced in a defined manner, it shears off the cylindrical body 4a of the securing bolt 4, in which case the defined moment is lower than the moment required for the destruction of the engagement areas of the securing bolt 4 and the lock bolt 5.

In a further modified embodiment of the securing arrangement according to the invention, the non-circular recess 4d is constructed as a hexagon socket and also fails at a defined moment lower than a moment required for destroying other areas of the bolt 4.

The securing arrangement according to the invention permits a reliable form-locking fastening of the lock housing 3 in the receiving console 2, in which case the securing bolt 4 used as the fastening element, when the steering wheel lock is locked in place, cannot even be removed by violent means, while, when the steering wheel lock is unlocked, it can particularly easily be removed from the housing.

What is claimed is:

1. A securing arrangement for a steering wheel lock which is fastened to a steering column tube of a steering system of a motor vehicle and has a steering-column-tube-side receiving device on which a lock housing is fastened, the receiving device and the lock housing having aligned bores which are penetrated by a securing bolt, the securing bolt being at least almost completely surrounded by the receiving device and/or by the lock housing, wherein the securing bolt has a first non-circular section to which a lock bolt, which can be moved between a blocking position and a release position, is applied in a form-locking manner outside the lock bolt's release position and blocks the securing bolt, the securing bolt being rotatably arranged between a displacement position, in which the securing bolt can be removed from the lock housing, and a detent position in which the securing bolt is blocked on a housing-fixed stop.

2. The securing arrangement according to claim 1, wherein the securing bolt has a recess as a first non-circular section, in which the lock bolt engages outside its release position, and in that the lock bolt has a recess in which the securing bolt engages outside the detent position, whereby the lock bolt is blocked in the release position.

3. The securing arrangement according to one of claim 1, wherein the securing bolt has a second non-circular section with a projection which protrudes eccentrically with respect to an axis of rotation, to which projection the housing-fixed stop is assigned.

4. The securing arrangement according to claim 3, wherein the radially protruding projection is designed as a bolt head on a face of the securing bolt which is arranged in a double-walled receiving pocket.

5. The securing arrangement according to claim 1, wherein the tool application surfaces are provided on a face of the securing bolt and are dimensioned such that forces which can be generated by an applied tool are lower than the counterforces defined by the form closure of the securing bolt and/or of the lock bolt.

6. The securing arrangement according to claim 5, wherein the tool application surfaces are arranged inside a recess in the face of the securing bolt.

7. A securing assembly for a steering wheel lock comprising:
(i) a lock housing having a first bore and a second bore, the lock housing being connectable to a receiving device, the receiving device having a first bore and a second bore, such that when the lock housing and the receiving device are connected the first bore and the second bore of the lock housing align with the first bore and the second bore of the receiving device, respectively,
(ii) a securing bolt having a first non-circular section, a face, and an axis of rotation, and
(iii) a lock bolt, movable between a release position and a blocking position, which prevents rotation or removal of the securing bolt when partially or completely moved into the blocking position
wherein, when installed into the connected receiving device and lock housing, the securing bolt penetrates the aligned first bores and the aligned second bores, and the securing bolt is at least almost completely surrounded by the receiving device or the lock housing or both, and the securing bolt is rotatable between a displacement position and a detent position; and wherein the securing bolt may be removed from the lock housing when arranged in the displacement position and the securing bolt may not be removed when arranged in the detent position.

8. The securing assembly of claim 7, wherein the first non-circular portion of the securing bolt is a securing bolt recess, and the lock bolt having a lock bolt recess, wherein the lock bolt, when partially or completely moved into the blocking position, engages the securing bolt recess, and wherein the securing bolt, when partially or completely moved into the displacement position, engages the lock bolt recess such that the lock bolt is prevented from moving into the blocking position.

9. The securing assembly of claim 7, wherein the securing bolt has a second non-circular section with a projection protruding radially from the axis of rotation, and wherein the receiving device has a housing fixed stop which may receive the projection.

10. The securing assembly of claim 7, wherein the radially-protruding projection is a bolt head, and the receiving device includes a double-walled receiving pocket, the double-walled receiving pocket arranged to receive the bolt head of the securing bolt.

11. The securing assembly of claim 7, wherein the securing bolt further comprises tool application surfaces provided on the face of the securing bolt, such that the tool application surfaces are sized so as to prevent rotation.

12. The securing assembly of claim 11, wherein the face of the securing bolt comprising a recess in which the tool application surfaces are provided.

* * * * *